United States Patent
Song et al.

(10) Patent No.: US 11,811,188 B2
(45) Date of Patent: Nov. 7, 2023

(54) SYSTEM FOR GENERATING PASSIVE-MODE-LOCKED PULSE LASER AT HIGH REPETITION RATE

(71) Applicant: KOREA INSTITUTE OF SCIENCE AND TECHNOLOGY, Seoul (KR)

(72) Inventors: Yong-Won Song, Seoul (KR); Sungjae Lee, Seoul (KR)

(73) Assignee: KOREA INSTITUTE OF SCIENCE AND TECHNOLOGY, Seoul (KR)

( * ) Notice: Subject to any disclaimer, the term of this patent is extended or adjusted under 35 U.S.C. 154(b) by 215 days.

(21) Appl. No.: 17/333,028

(22) Filed: May 28, 2021

(65) Prior Publication Data

US 2022/0140564 A1  May 5, 2022

(30) Foreign Application Priority Data

Oct. 29, 2020  (KR) .................. 10-2020-0142114

(51) Int. Cl.
*H01S 3/1115*  (2023.01)
*H01S 3/067*  (2006.01)

(52) U.S. Cl.
CPC ........ *H01S 3/1115* (2013.01); *H01S 3/06745* (2013.01); *H01S 3/06791* (2013.01)

(58) Field of Classification Search
CPC .............. H01S 3/1115; H01S 3/06745; H01S 3/06791; H01S 3/06704; H01S 3/1118; H01S 3/06712; H01S 3/094003; H01S 3/09415; H01S 3/1112; H01S 3/1608
See application file for complete search history.

(56) References Cited

U.S. PATENT DOCUMENTS

| 5,504,771 A * | 4/1996 | Vahala | H01S 3/06791 372/6 |
| 5,513,194 A * | 4/1996 | Tamura | H01S 3/06791 372/18 |
| 9,425,899 B2 * | 8/2016 | Sekiguchi | G02F 1/025 |
| 2007/0177641 A1 * | 8/2007 | Liu | H01S 3/1112 372/30 |

(Continued)

FOREIGN PATENT DOCUMENTS

| CN | 104597311 A | 5/2015 |
| CN | 105337149 A | 2/2016 |

(Continued)

OTHER PUBLICATIONS

G. Sobon et al., "Passive harmonic mode-locking in Er-doped fiber laser based on graphene saturable absorber with repetition rates scalable to 2.22 GHz", Appl. Phys. Lett. 100, 161109 (2012) (Year: 2012).*

(Continued)

*Primary Examiner* — Xinning(Tom) Niu
(74) *Attorney, Agent, or Firm* — CANTOR COLBURN LLP

(57) ABSTRACT

Embodiments relate to a resonator including a graphene layer formed on a support, and a tapered fiber disposed around at least part of the support, close to the graphene layer, wherein the tapered fiber has different paths along which light travels in a region extending from one end and a region extending from the other end, and a passive-mode-locked pulse laser oscillation system including the same.

16 Claims, 12 Drawing Sheets

(56) References Cited

U.S. PATENT DOCUMENTS

2020/0303890 A1    9/2020   Kim
2020/0335931 A1   10/2020   Song et al.

FOREIGN PATENT DOCUMENTS

| KR | 10-2014-0049994 A | 4/2014 |
| --- | --- | --- |
| KR | 10-1502390 B1 | 3/2015 |
| KR | 10-2016-0109809 A | 9/2016 |
| KR | 10-2017-0135541 A | 12/2017 |
| KR | 10-2020-0112648 A | 10/2020 |
| KR | 10-2020-0122529 A | 10/2020 |

OTHER PUBLICATIONS

Jin-Hui Chen et al. "An all-optical modulator based on a stereo graphene-microfiber structure", Light:Science & Applications, 4, e360, 2015. (Year: 2015).*

J. Sotor et al., "Black phosphorus saturable absorber for ultrashort pulse generation," Applied Physics Letters, 2015, 5 pages, vol. 107, No. 051108.

M. Peccianti et al., "Demonstration of a stable ultrafast laser based on a nonlinear microcavity," Nature Communications, 2012, 6 pages, vol. 3, No. 765, Macmillan Publishers Limited.

Dong Mao et al., "Flexible high-repetition-rate ultrafast fiber laser," Scientific Reports, 2013, 5 pages, vol. 3, No. 3223.

Meng Liu et al., "Graphene-decorated microfiber knot as a broadband resonator for ultrahigh-repetition-rate pulse fiber lasers," Photonics Research, 2018, 7 pages, vol. 6, No. 10, Chinese Laser Press.

Amos Martinez et al., "10GHz fundamental mode fiber laser using a graphene saturable absorber," Applied Physics Letters, 2012, 3 pages, vol. 101, No. 041118, American Institute of Physics.

Grzegorz Sobon et al., "Passive harmonic mode-locking in Er-doped fiber laser based on graphene saturable absorber with repetition rates scalable to 2.22GHz," Applied Physics Letters, 2012, 4 pages, vol. 100, No. 161109, American Institute of Physics.

Yong-Won Song et al., "Graphene mode-lockers for fiber lasers functioned with evanescent field interaction," Applied Physics Letters, 2010, 3 pages, vol. 96, No. 051122, American Institute of Physics.

Jochen Schroder et al., "Passively mode-locked Raman fiber laser with 100 GHz repetition rate," Optics Letters, 2006, pp. 3489-3491, vol. 31, No. 23, Optical Society of America.

Weiqiang Wang et al., "Repetition Rate Multiplication Pulsed Laser Source Based on a Microring Resonator," ACS Photonics, Jun. 2017, pp. 1677-1683, vol. 4, American Chemical Society.

Xuetao Gan et al., "Graphene-assisted all-fiber phase shifter and switching," Optica, May 2015, pp. 468-471, vol. 2, No. 5, Optical Society of America.

* cited by examiner

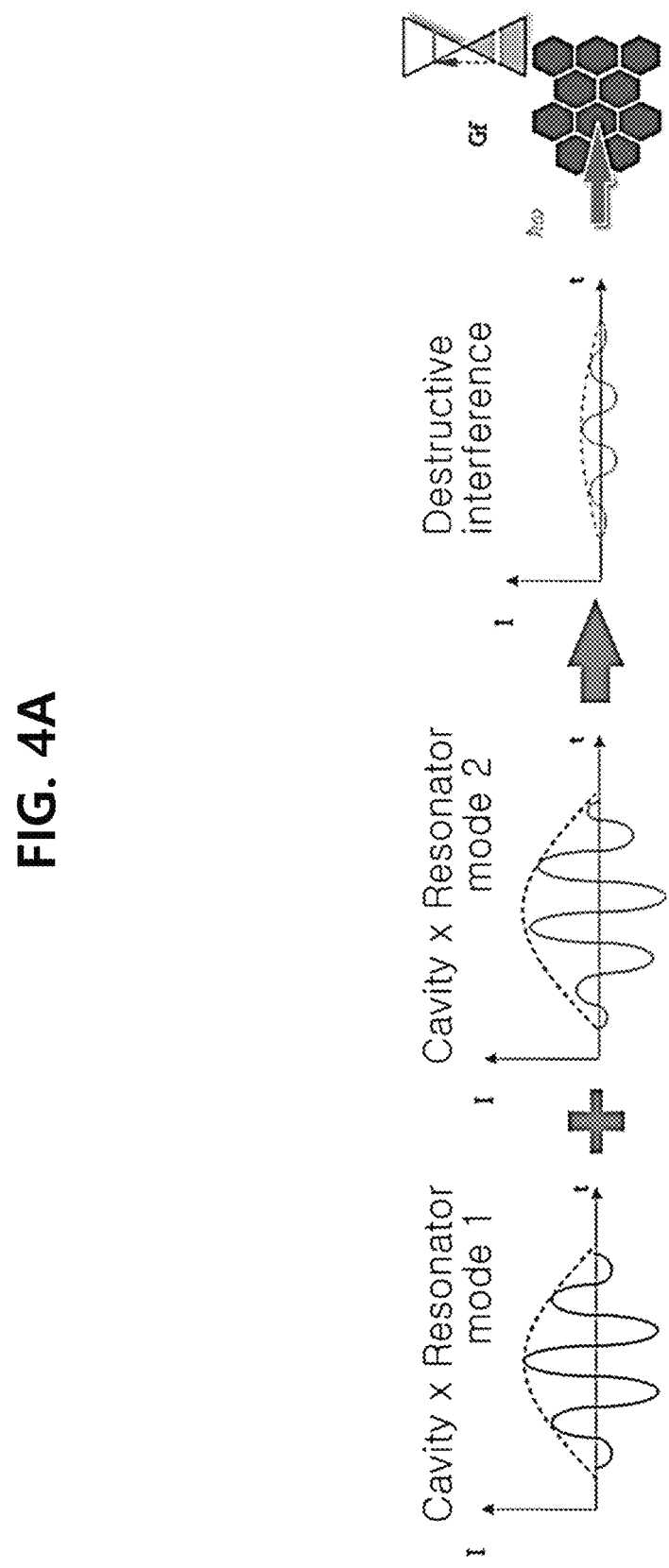

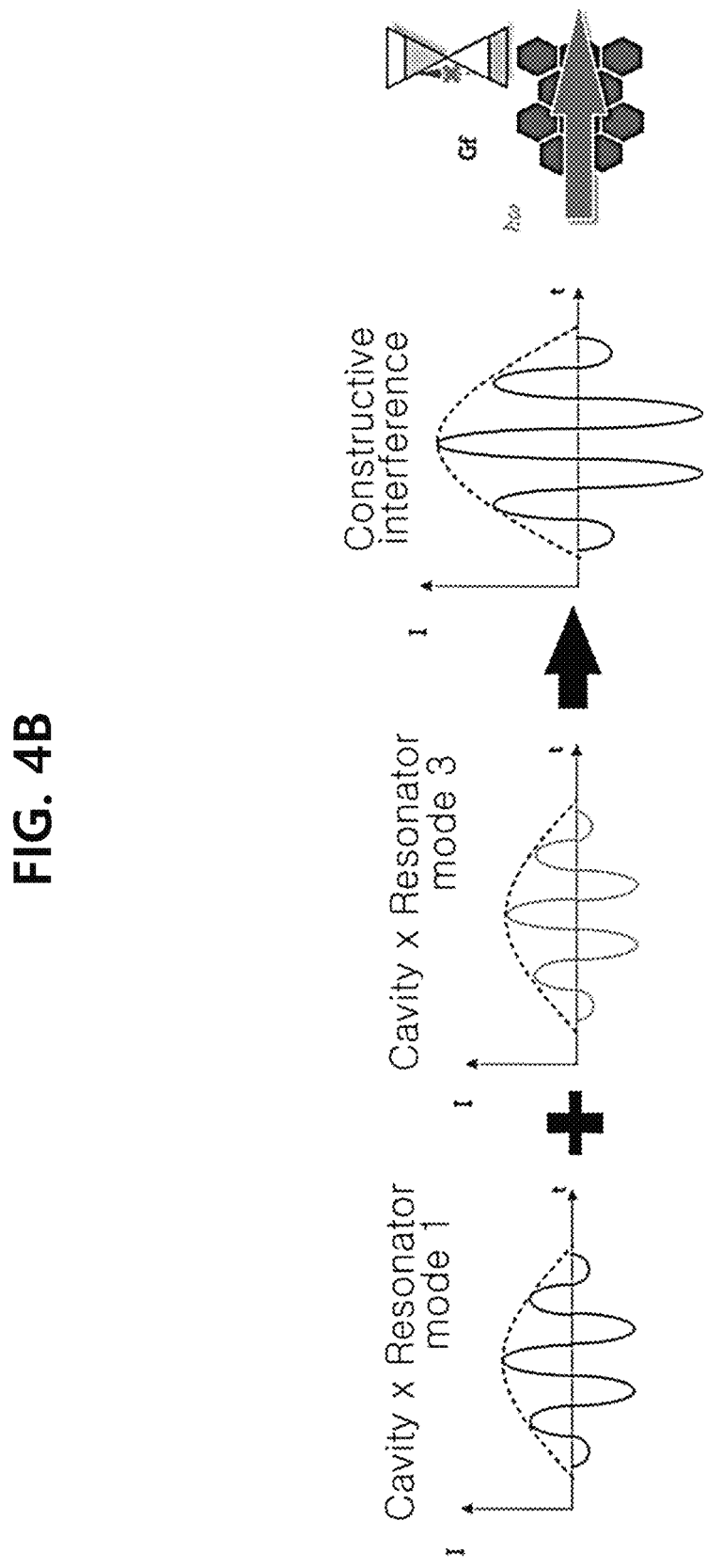

FIG. 8A
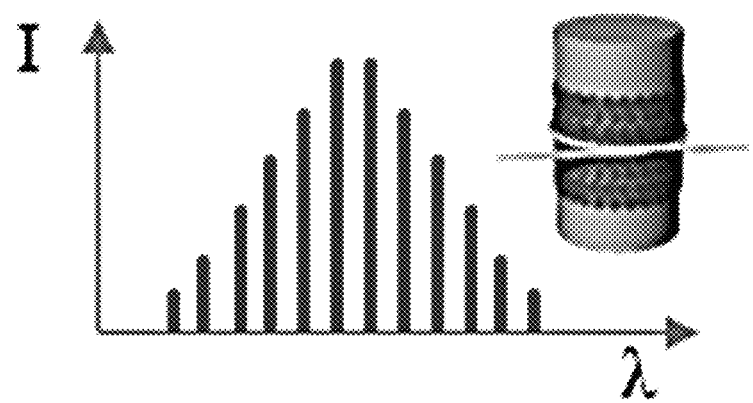
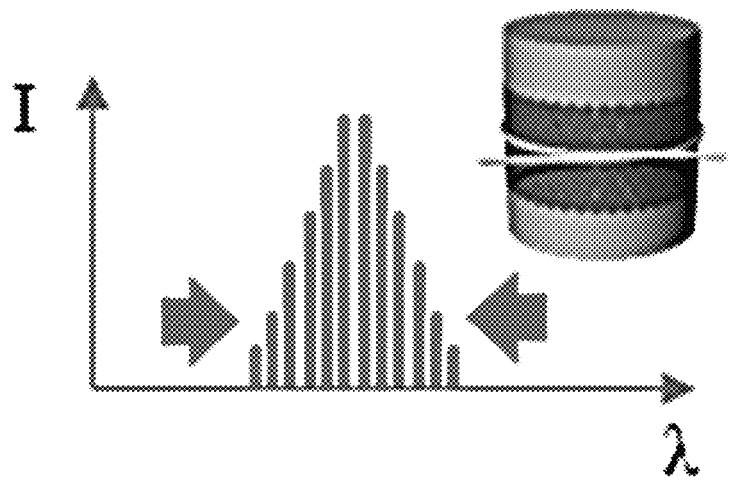

FIG. 8B
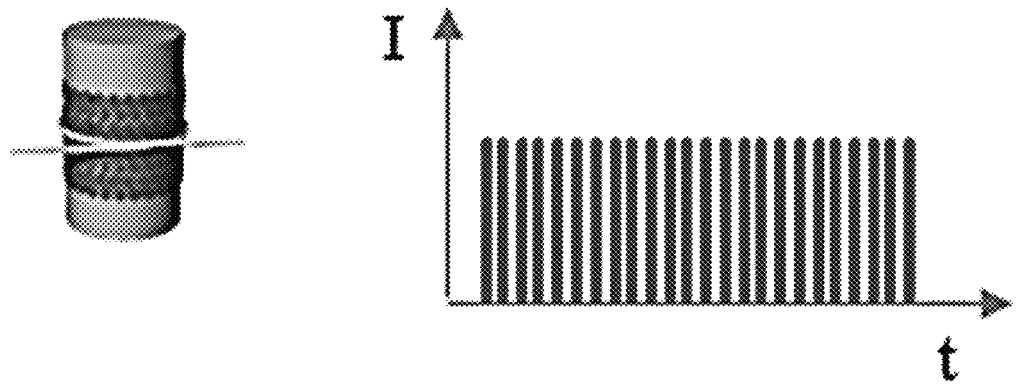
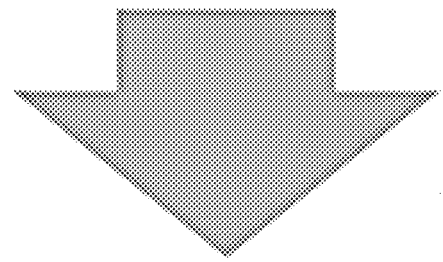
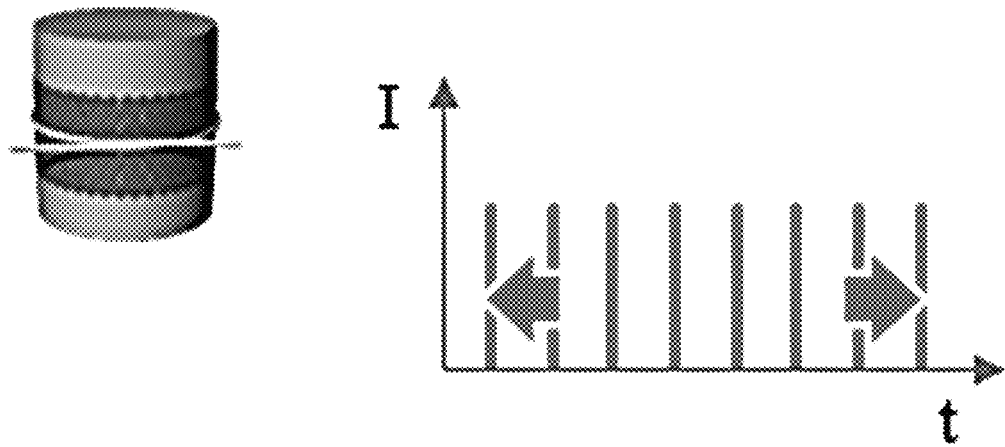

SYSTEM FOR GENERATING PASSIVE-MODE-LOCKED PULSE LASER AT HIGH REPETITION RATE

CROSS-REFERENCE TO RELATED APPLICATION

This application claims priority to Korean Patent Application No. 10-2020-0142114, filed on Oct. 29, 2020, and all the benefits accruing therefrom under 35 U.S.C. § 119, the contents of which in its entirety are herein incorporated by reference.

TECHNICAL FIELD

Embodiments relate to a pulse laser oscillation system, and more particularly, to a resonator based on an optical fiber coupled with a material having optical nonlinearity and a system for oscillating a pulse laser with a high repetition rate of GHz or above by passive mode-locking using the same.

NATIONAL RESEARCH AND DEVELOPMENT SUPPORT

This work was supported by the Basic Science Research Program (Grant No. NRF-2019R1A2C2087693) of the National Research Foundation (NRF) funded by the Ministry of Science and ICT, Republic of Korea, and supported by the Institutional Program (2E30420) funded by the Korea Institute of Science and Technology (KIST), Republic of Korea.

BACKGROUND ART

An optical fiber has low loss, insusceptibility to external magnetic fields, wide bandwidth, low price and small and flexible structural advantages. Accordingly, an optical fiber based pulse laser has a wide range of applications including industrial processing, information communication, LIDAR and medical surgery equipment.

The typical optical fiber laser oscillation technique, passive mode-locking, produces a femtosecond-level ultrashort pulse laser. However, due to the dependence of the pulse repetition rate on the length of an optical fiber laser cavity, the commonly used passive mode-locking has the limited pulse repetition rate of MHz level.

DISCLOSURE

Technical Problem

According to an aspect of the present disclosure, an additional resonator in a main cavity of an optical fiber laser is provided for a passive-mode-locked pulse laser with a GHz-level high repetition rate.

In addition, according to another aspect of the present disclosure, there is provided a passive-mode-locked pulse laser oscillation system including the resonator.

Technical Solution

A resonator for a laser oscillation system including a laser cavity for laser oscillation according to an aspect of the present disclosure includes a saturable absorption layer formed on a support, and a tapered fiber disposed around at least part of the support to be adjacent to the saturable absorption layer, wherein the tapered fiber is formed so that directions of an optical path of a part extending from one end of the tapered fiber and another optical path of another part extending from the other end are different from each other.

In an embodiment, the resonator may generate an interference pattern in which constructive interference or destructive interference repeats according to a wavelength of the light traveling along the same path.

In an embodiment, the saturable absorption layer may be formed on at least part of a surface of a cross section of the support, and at least part of the tapered fiber may come into contact with the saturable absorption layer.

In an embodiment, the light traveling in the tapered fiber may interact with the saturable absorption layer, and some modes that have phases being matched in the light traveling in the tapered fiber constructively interfere to output a higher intensity of light, and other modes that have phases being unmatched in the light traveling in the tapered fiber destructively interfere to output a lower intensity of light.

In an embodiment, the tapered fiber may form a ring, and the ring of the tapered fiber may filter a spectrum of the traveling light at a periodic spectral spacing.

In an embodiment, a resonance wavelength of the interference pattern by the light traveling in the ring may be represented as the following Equation:

$$\lambda_{res} = \frac{nL}{m} \quad \text{[Equation]}$$

where L is a length of the ring, n is a refractive index of the ring, m is an integer of 1 or greater, destructive interference periodically occurs in proportion to a value of m, and the modes having the phases being matched each other are filtered to output from surviving modes by saturable absorption of the saturable absorption layer within the light traveling in the tapered fiber.

In an embodiment, when the filtered light is re-input through an input terminal of the ring, the intensity of the modes having the matched phases increases, and the intensity of the modes having the unmatched phases reduces.

In an embodiment, the saturable absorption layer may absorb a mode having a predetermined intensity or less.

In an embodiment, the ring may be formed such that an extinction ratio of transmission of the light traveling in the ring is maximum.

In an embodiment, a repetition rate of the pulses through the tapered fiber may be adjustable based on a diameter of the ring formed by the tapered fiber disposed around the support.

In an embodiment, the support may be made of a material which changes in size by reaction with heat, the saturable absorption layer may generate heat when absorbing light, and a repetition rate of the output light from the tapered fiber may be controlled by the heat induced size change of the support.

In an embodiment, the support may be made of a material that show catalytic activity for the catalytic layer synthesis. The said material is selected from the group including at least one of Cu, Ni or a combination thereof.

In an embodiment, the repetition rate of the output light may reduce when the diameter of the support is increased by thermal expansion.

In an embodiment, the resonator may further include one or more of the tapered fiber. At least some of the plurality of tapered fibers in the resonator includes the tapered fibers having different diameters.

In an embodiment, the support may be formed with different diameters at a region and another region.

A pulse laser oscillation system according to another aspect of the present disclosure may include the resonator according to the above-described embodiments, a first light source which supplies light to an input terminal of the tapered fiber, a Wavelength Division Multiplexer (WDM) which performs wavelength division multiplexing of the light of the first light source, an amplifier which amplifies an input light, a polarization controller which controls a state of polarization of the light, an optical isolator which allows unidirectional propagation of the light, and an optical fiber which forms a laser cavity.

In an embodiment, the pulse laser oscillation system may further include a second light source which supplies a pump light through an output terminal of the tapered fiber.

Advantageous Effects

The resonator according to an aspect of the present disclosure forms a pulse laser by interaction between light traveling in the tapered fiber and graphene. In particular, the resonator may output a laser having a specific frequency in a periodic manner by filtering the spectrum of light traveling in the resonator with a specific spectral period through the tapered fiber that forms an intersection structure such as a ring structure.

To fabricate the resonator, graphene is directly synthesized on the surface of the support, so there is no risk of quality degradation through transfer. Additionally, the resonator is freely attachable or detachable to/from the laser oscillation system, so there are advantages in terms of individual examination and maintenance and repair of the resonator device.

When the resonator is applied to the laser cavity of the passively mode-locked pulse laser oscillation system, the saturable absorption effect of graphene in the resonator and the filtering effect of the resonator change the pulse spectrum and increase the repetition rate to the GHz level, thereby achieving the high repetition rate very effectively, and an additional optical delay line is not required through the automatic phase matching phenomenon by graphene.

Additionally, when an additional pump light is applied to the resonator, the repetition rate of the pulse laser may be controlled.

The effects of the present disclosure are not limited to the above-mentioned effects, and other effects not mentioned herein will be clearly understood by those skilled in the art from the appended claims.

DESCRIPTION OF DRAWINGS

The following is a brief introduction to necessary drawings in the description of the embodiments to describe the technical solutions of the embodiments of the present disclosure or the prior technology more clearly. It should be understood that the accompanying drawings are for the purpose of describing the embodiments of the present disclosure and are not intended to be limiting of the present disclosure. Additionally, for clarity of description, illustration of some elements in the accompanying drawings may be exaggerated and omitted.

FIG. 4A is a conceptual diagram of destructive interference of modes passing through a laser cavity and a resonator according to an embodiment of the present disclosure, and FIG. 4B is a conceptual diagram of constructive interference of modes passing through a laser cavity and a resonator according to an embodiment of the present disclosure.

FIG. 8A is a diagram showing a change in light spectrum of a pulse laser with a change in diameter of a resonator according to an embodiment of the present disclosure, and FIG. 8B is a diagram showing a change in spacing of a pulse laser in the time domain with a change in diameter of a resonator according to an embodiment of the present disclosure.

BEST MODE

The terminology used herein is for the purpose of describing particular embodiments only and is not intended to be limiting of the present disclosure. Unless the context clearly indicates otherwise, the singular forms as used in the specification and the appended claims are intended to include the plural forms as well. Additionally, it should be understood that the term "and/or" as used herein includes any or all possible combinations of one or more relevant items enumerated herein.

When an element is referred to as being "on" another element, the element may be on the other element, or there may be intervening elements between them. In contrast, when an element is referred to as being "immediately on" another element, there is no intervening element between them.

The terms "first", "second", "third" and the like are used to describe various portions, components, regions, layers and/or sections, but are not limited thereto. These terms are used to distinguish a portion, component, region, layer or section from another portion, component, region, layer or section. According, a first portion, component, region, layer or section described as below may be referred to as a second portion, component, region, layer or section without departing from the scope of the present disclosure.

The terminology used herein is for the purpose of describing particular embodiments only and is not intended to be limiting of the present disclosure. Unless the context clearly indicates otherwise, the singular forms as used herein include the plural forms as well. The terms "comprise" when used in this specification, specify the presence of stated features, regions, integers, steps, operations, elements, and/or components, but do not preclude the presence or addition of one or more other features, regions, integers, steps, operations, elements and/or components.

Unless otherwise defined, all terms including technical and scientific terms used herein have the same meaning as commonly understood by those skilled in the art. It will be further understood that terms, such as those defined in commonly used dictionaries, should be interpreted as having a meaning that is consistent with their meaning in the context of the relevant art document and the present disclosure, and will not be interpreted in an idealized or overly formal sense unless expressly so defined herein.

Hereinafter, the embodiments of the present disclosure will be described in detail with reference to the accompanying drawings.

A passive-mode-locked pulse laser oscillation system according to an aspect of the present disclosure may produce a GHz scale pulse laser by a resonator including a resonator, a graphene and a support. Additionally, the pulse laser oscillation system may control the repetition rate of light traveling in the ring by controlling the diameter of the ring of the resonator.

Figure 1:
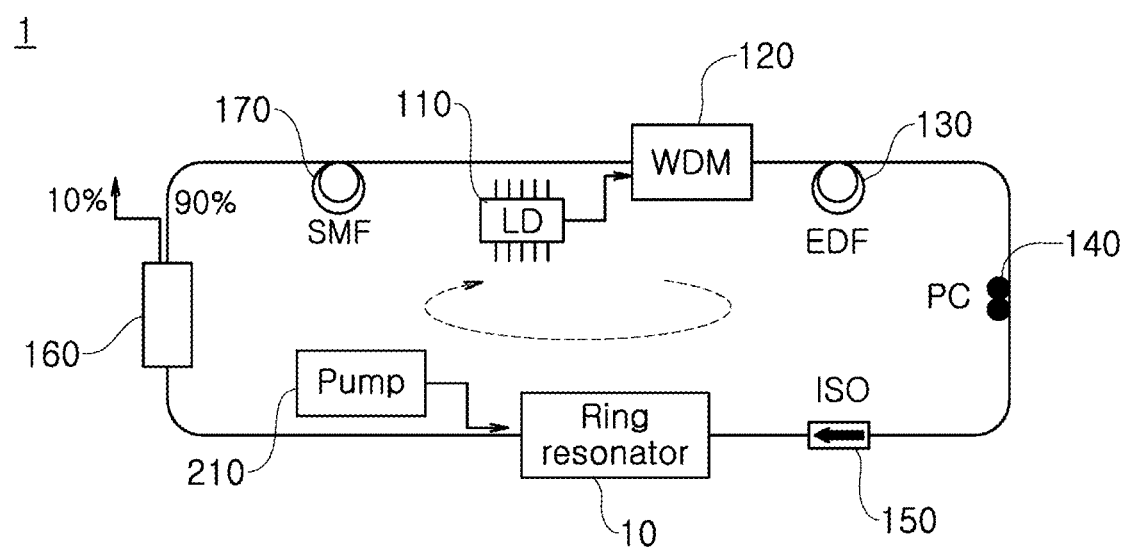
FIG. 1 is a conceptual diagram of a passively mode-locked optical fiber laser cavity based pulse laser oscillation system according to an aspect of the present disclosure.

FIG. 1 is a conceptual diagram of a passive-mode-locked optical fiber laser cavity based pulse laser oscillation system according to an aspect of the present disclosure.

Referring to FIG. 1, the passive-mode-locked pulse laser oscillation system 1 includes a resonator 10. In specific embodiments, the passive-mode-locked pulse laser oscillation system 1 may further include at last one of a light source 110, a Wavelength Division Multiplexer (WDM) 120, an amplifier 130, a polarization controller (PC) 140, an optical isolator 150, a single mode optical fiber 170, or an optical coupler 160. Additionally, in some embodiments, the passive-mode-locked pulse laser oscillation system 1 may further include a light source 210.

The components 110 to 160, 210 of the passive-mode-locked pulse laser oscillation system 1 are optically connected through the optical fiber (or an optical waveguide). The optical fiber may be a single mode optical fiber (SMF). The optical fiber forms a laser cavity structure. For example, as shown in FIG. 1, the optical fiber may form a ring-shaped laser cavity structure. The laser cavity is the most main cavity among cavities included in the pulse laser oscillation system 1.

The light source 110 outputs light which is an input to the laser cavity, to supply the light to the input terminal of the resonator 10. The light source 110 may input a continuous wave light to the laser cavity. The light source 110 may be a laser diode (LD), but is not limited thereto. In some embodiments, the light source 110 may be configured to output light of the communication wavelength band.

The WDM 120 combines the light from the light source 110 with light of the other wavelengths.

The amplifier 130 amplifies the output light from the WDM 120. The amplifier 130 may be, for example, an Erbium Doped Fiber (EDF), but is not limited thereto.

The polarization controller 140 tunes the state of polarization (SOP) of light traveling a round-trip to satisfy the mode-locking condition for light of the laser cavity.

The optical isolator 150 allows unidirectional light propagation in the laser cavity.

The optical coupler 160 outputs a part of the light of the laser cavity. For example, the optical coupler 160 may be a 90:10 coupler to extract 10% of the light as output.

The resonator 10 receives the light traveling through the optical waveguide and filters such that the spectrum of the light has a specific period to form a GHz pulse laser by interaction between the light and the saturable absorber having optical nonlinearity. The resonator 10 will be described in more detail with reference to FIG. 2 below.

The light source 210 inputs light traveling in the opposite direction to the direction of the pulse traveling in the laser cavity of the passive-mode-locked pulse laser oscillation system 1. In an embodiment, the light source 210 may output a pump light.

The light from the light source 210 travels to the resonator 10 which interacts with a graphene layer 13. The light source 210 supplies the light to the output terminal of the resonator 10. Since the light traveling in the opposite direction to the pulse of the light source 110 has the same wavelength, but they do not affect each other, the light source 210 is not involved in laser oscillation and is used to control the pulse repetition rate. The light source 210 will be described in more detail with reference to FIG. 6 below.

Figure 2:
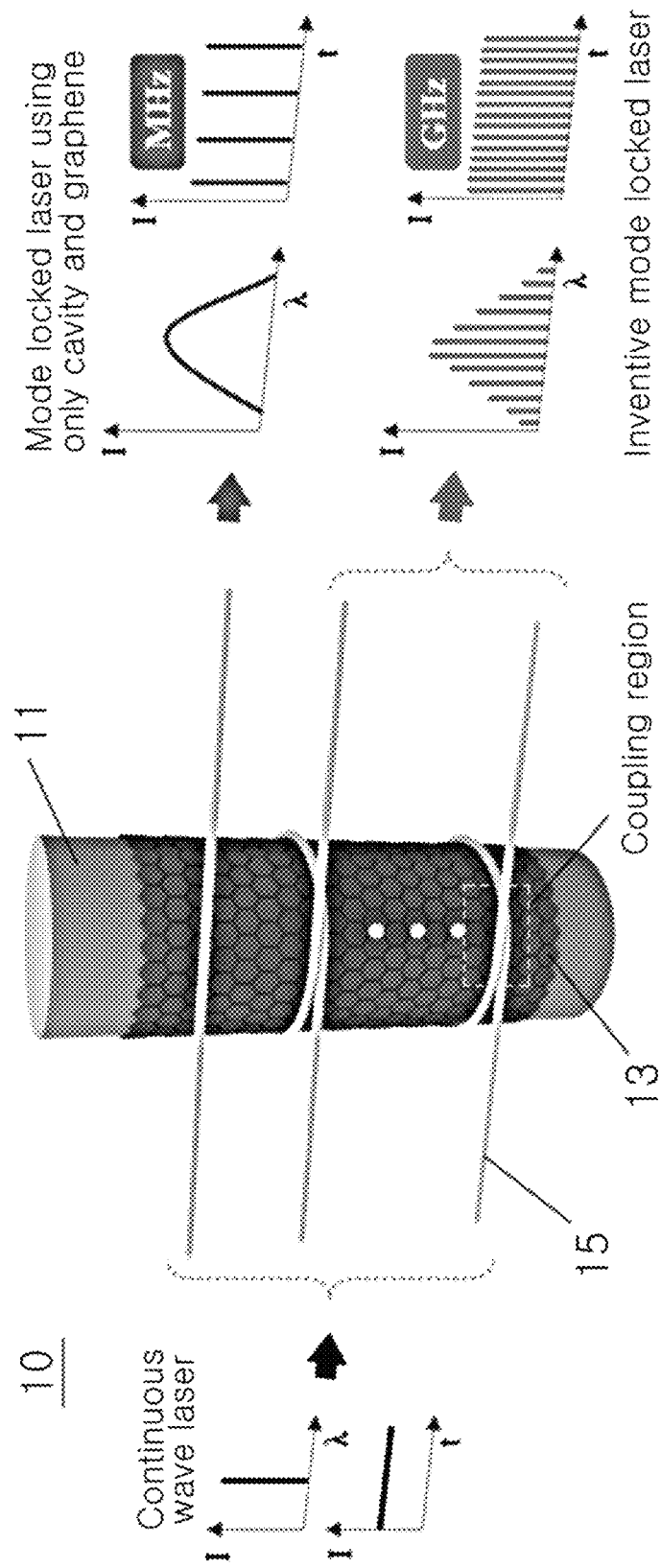
FIG. 2 is a perspective view of a resonator according to an embodiment of the present disclosure.

FIG. 2 is a perspective view of the resonator according to an embodiment of the present disclosure.

Referring to FIG. 2, the resonator 10 includes a support 11, a tapered fiber 15 disposed around the support 11, and a saturable absorption layer 13. In some embodiments, the resonator 10 may include a plurality of tapered fibers 15 disposed around the support 11.

The tapered fiber 15 forms an intersection structure of one end and the other end. For example, as shown in FIG. 2, the tapered fiber 15 may form a ring structure. However, the intersection structure of the resonator 10 is not limited to a ring structure. Hereinafter, for clarity of description, the present disclosure will be described in more detail by referring to the resonator 10 having the tapered fiber 15 of the ring structure as a ring resonator by way of illustration only.

The support 11 is a rigid object which supports the graphene layer 13. The saturable absorption layer 13 is positioned on the surface the support 11. The saturable absorption layer 13 is made of a mode-locking saturable absorber. The saturable absorber may include 2-dimensional nanomaterials such as, for example, CNT, graphene, $MoS_2$ or black phosphorus. Hereinafter, for clarity of description, the present disclosure will be described in more detail based on embodiments using graphene as the saturable absorber.

In an embodiment, the graphene layer 13 may be formed on the surface of the support 11. For example, the graphene layer 13 may be formed along the cross-sectional periphery of the support 11 in whole or in part as shown in FIG. 2.

To this end, the support 11 is made of a material capable of forming the graphene layer 13 on the surface.

In an embodiment, the material of the support 11 may be a material serving as a catalyst for forming graphene. The support 11 may be made of a material that show catalytic activity for the catalytic layer synthesis. The said material may be selected from the group including at least one of Cu, Ni and other materials used as a catalyst for nanostructure synthesis or a combination thereof.

In an example, the support 11 may be an electrical wire made of copper, i.e., a copper wire (Cu wire). The graphene layer 13 may be formed without transfer by directly synthesizing graphene on the surface of the copper wire 11 using a chemical deposition method by which carbon atoms are fed near the surface of the copper wire.

In another example, the support 11 may be an electrical wire made of nickel, i.e., a nickel wire (Ni wire). Nickel has high carbon solubility, and solubility increases in proportion to temperature. When carbon atoms are dissolved in nickel at high temperature, the carbon atoms are contained in nickel. When light in the wavelength bands for communication is supplied through the optical fiber, heat which is high enough to synthesize graphene may be generated on the nickel surface. Subsequently, when the temperature decreases, graphene may be formed on the surface by diffusion of the carbon atoms on the nickel surface. The oscillation of the pulse laser with an ultrafast repetition rate is driven by interaction between the graphene layer 13 on the nickel surface and the light traveling in the tapered fiber 15.

However, graphene may be formed through a variety of other methods. The graphene may be synthesized on the surface of the support 11 using a non-metal catalyst such as, for example, γ-$Al_2O_3$.

In addition to serving as a catalyst for forming the graphene as described above, the support 11 also plays a role in supporting the structure formed by the tapered fiber 15. The ring resonator 10 having the support 11 does not have graphene quality degradation caused by transfer.

The ring resonator 10 is connected to the optical fiber of the laser cavity of FIG. 1 through one end and the other end of the tapered fiber 15.

In an embodiment, a part of the optical fiber of the passive-mode-locked pulse laser oscillation system 1 may be fabricated and used as a tapered fiber.

In another embodiment, one end and the other end of the tapered fiber forming the ring resonator may be optically connected to the optical fiber of the passive-mode-locked pulse laser oscillation system 1.

The tapered fiber is fabricated by a process (tapering) of applying tensile forces to two sides of the single mode optical fiber while heating, so that the diameter of the heated part of the optical fiber decreases and the length of the same part increases. For example, the tapered fiber having the diameter of about 1.8 μm may be fabricated by pulling the single mode optical fiber having the original diameter of 125 μm while it is heated.

As described above, as the diameter decreases, the tapered fiber may interact with a material close to the tapered fiber more strongly by the expansion of the evanescent field of the light traveling in the optical fiber.

When a continuous wave light is input to the prior mode-locked laser oscillation system without the ring resonator 10, a MHz pulse laser is formed as shown on the top right side of FIG. 2.

In contrast, when the ring resonator 10 according to embodiments of the present disclosure is additionally applied to the prior mode-locked laser oscillation system, the pulse spectrum is changed by the filtering effect of the ring resonator made of the tapered fiber 15, and phases match between each mode of the spectrum by the saturable absorption effect of graphene to form pulses with a higher repetition rate. As a result, it is possible to oscillate the pulse laser with a GHz scale ultrafast repetition rate as shown in FIG. 2.

Modes satisfying a specific condition may survive in the circular main laser cavity of the system 1. The specific condition is a saturable absorption condition that an intense fraction at the pulse center survives and a weak fraction at the pulse edge is removed by a polarizer within the laser cavity, and the condition is polarization, pump power, non-linearity and dispersion. The conditions may be satisfied by the components 120, 130, 140, 160 of the laser cavity.

When the specific conditions are satisfied, the saturable absorption characteristics of graphene matches the phases of light that is traveling in the laser cavity.

Among the surviving modes, some modes having the matched phases interfere constructively to generate a stronger signal. Other modes having the unmatched phases interfere destructively then the intensity of other modes is reduced, thus other modes are absorbed by the graphene due to losses each repeated round-trip in the ring resonator. As a result, only the modes having matched phases survive and they form a pulse laser. The solution of the light traveling in the ring resonator of the passive-mode-locked laser using the saturable absorber is represented as below.

$$\frac{1}{T_R}\frac{\partial a}{\partial T} = (g-l)a + \left(\frac{1}{\Omega_f^2} + jD\right)\frac{\partial^2 a}{\partial t^2} + (\gamma = j\delta)|a|^2 a \qquad \text{[Equation 1]}$$

Here, $T_R$ denotes the round-trip time, a(T, t) denotes the envelope of the pulse, g denotes a gain obtained during a single round-trip, l denotes a loss obtained during a single round-trip, $1/\Omega_f^2$ denotes the filter characteristics, D denotes the group velocity dispersion, γ denotes the self-amplitude modulation coefficient, and δ denotes the Kerr coefficient and is defined as $(2//\lambda)n_2 Lc/A_{eff}$. Lc denotes the length of a medium, i.e., the length of the laser cavity, and $A_{eff}$ denotes the effective mode area.

In an embodiment, the solution of the above Equation 1 may be represented as blow.

$$a(t) = A_0 \text{sech}^{(1+j\beta)}\left(\frac{t}{\tau}\right) \qquad \text{[Equation 2]}$$

Here, $A_0$ is the pulse intensity, β is the propagation constant, and τ is the pulse duration. This solution may be used as a reference for the experimentally characterized output pulse.

Due to the saturable absorption characteristics, the graphene allows a high intensity of light to pass through and absorbs a low intensity of light. Thus, the pulse laser oscillates. The saturable absorption characteristics are explained by the Pauli blocking principle in which the conduction band of graphene is completely filled and incident light can no longer be absorbed.

The light traveling in the tapered fiber 15, to be filtered, includes the modes of the solution satisfying the above Equations 1 and 2.

Figure 3:
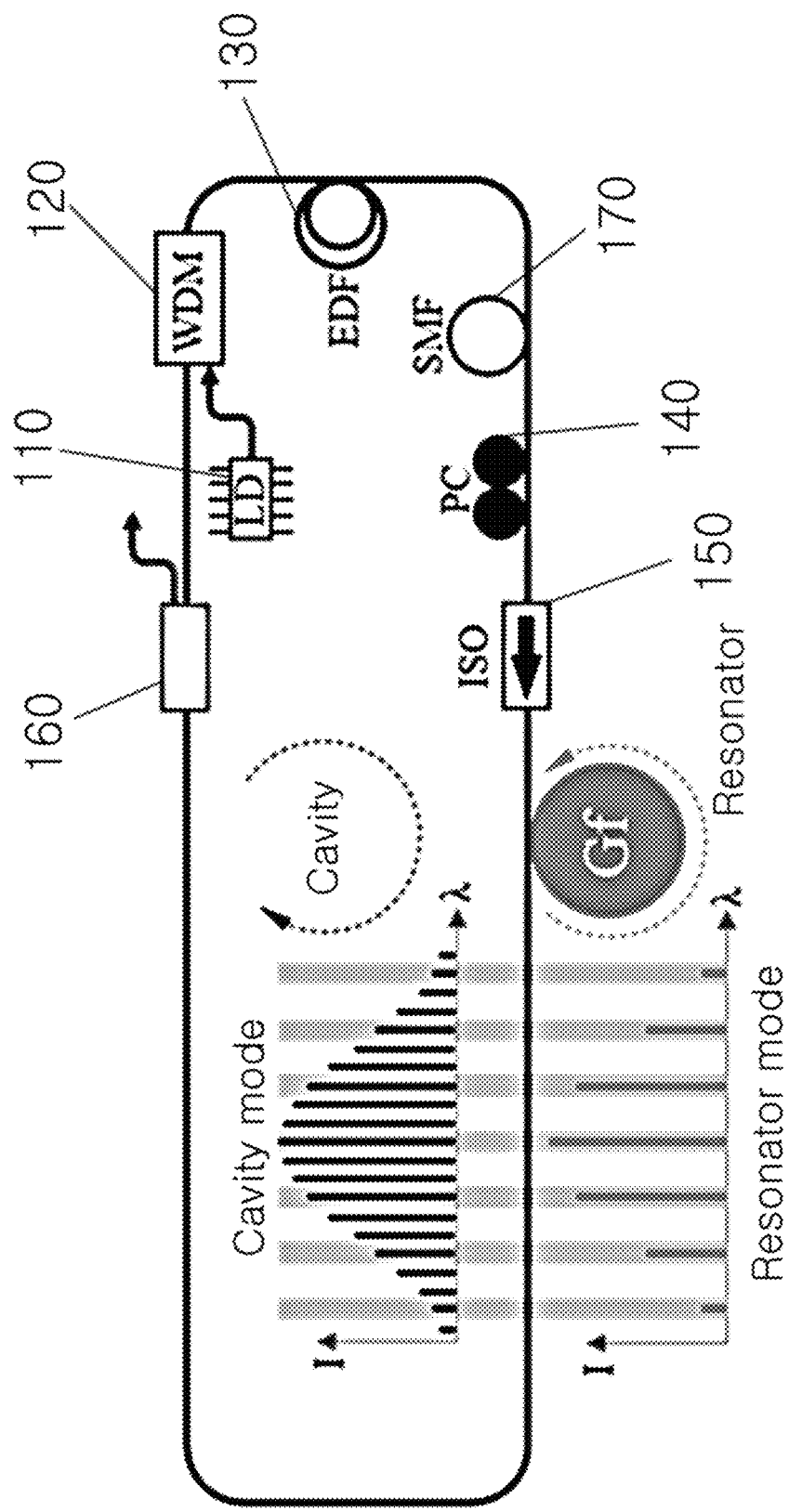
FIG. 3 is a conceptual diagram of the operation of a resonator in a laser cavity according to an embodiment of the present disclosure.

FIG. 3 is a conceptual diagram of the operation of the resonator in the laser cavity according to an embodiment of the present disclosure.

Referring to FIG. 3, the pulse laser may be formed from the light traveling in the laser cavity of the passive-mode-locked pulse laser oscillation system 1 by the saturable absorption phenomenon of graphene.

The prior passive-mode-locked pulse laser oscillation system using only the laser cavity and the graphene generates a pulse train having a narrower spacing as shown in FIG. 2.

Meanwhile, as described above, the tapered fiber 15 forms the intersection structure (for example, a ring structure) of one end and the other end.

The tapered fiber 15 is disposed around at least part of the support 11 and/or the graphene layer 13. In this case, when the tapered fiber 15 and the graphene layer 13 are arranged in linear contact with each other, interaction may occur on a longer light path with a smaller space.

Under the intersection structure, the tapered fiber 15 has a shape to be formed such that directions of an optical path of a part extending from one end of the tapered fiber and another optical path of another part extending from the other end are different from each other. The light traveling in the tapered fiber 15 has different directions at a region extending from one end and another region extending from the other end.

For example, the tapered fiber may be bent such that the input terminal and the output terminal of the ring in the ring resonator 10 intersect at a specific region and extend in the opposite directions.

The shape of the ring resonator 10 having the intersection structure may be elliptical or circular. The ring resonator 10 has a small cavity in the shape of a ring around the support 11 and/or the graphene 13 as a light path.

The specific region in which one end and the other end of the tapered fiber 15 intersect resides in an interference field range forming an interference pattern between lights traveling along adjacent light paths in different directions. In specific embodiments, as shown in FIG. 2, the specific region in the interference field range may be a region coupled to the laser cavity of the passive-mode-locked pulse laser oscillation system 1 (hereinafter, a "coupling region"). The intersection of one end and the other end of the tapered fiber 15 is positioned in the coupling region.

In specific embodiments, as shown in FIG. 2, one end and the other end of the tapered fiber 15 may intersect in contact with each other at the coupling region.

The structure of the tapered fiber 15 disposed around the support 11 may be fixed by the support 11. As shown in FIG. 2, when the tapered fiber 15 is disposed around the support 11, the ring structure formed by the tapered fiber 15 may be fixed. Thus, the structure of the light path of the ring resonator 10 is maintained, and the intersection structure of the input terminal and the output terminal of the ring resonator 10 is also maintained.

When the tapered fiber 15 is fixed through physical contact with the support 11, the ring resonator 10 is freely attachable or detachable, so there are advantages in terms of individual examination and maintenance and repair of the device.

The interference pattern formed at the intersection is a pattern formed by repetition of constructive interference or destructive interference according to the wavelength of the two lights having different paths. Here, the different paths means that optical paths are different instead of the physical paths. Although the light propagates along a same physical path in the same medium, the light has different refractive indexes depending on the wavelengths of the light. The light experiences a longer optical distance in the medium having a higher refractive index even if the light propagates the same physical distance. The ring resonator having the crossing portion forms the said interference pattern by wavelengths traveling along different optical paths.

The resonance wavelength $\lambda_{res}$ of interference pattern is determined by the length L and the refractive index n of the circular waveguide, i.e., the ring. The resonance wavelength may be represented as the following Equation:

$$\lambda_{res} = \frac{nL}{m} \quad \text{[Equation 3]}$$

Here, m is an integer of 1 or greater. The resonance wavelength is periodically repeated in proportion to m=1, 2, 3 . . . . The periodicity of the resonance wavelength is referred to as free spectral range (FSR), and may be represented as the following Equation.

$$FSR = \frac{\lambda^2}{nL} \quad \text{[Equation 4]}$$

The FSR refers to the spacing in wavelength at which the intensity of the transmitted light reduces by the filtering effect of the ring tapered fiber 15.

The destructive interference of light occurs in the resonance wavelength, and the transmission or intensity of light reduces. That is, the filtering effect occurs, in which the destructively interfering components of the input light of the ring resonator are removed and not output to the ring resonator 10.

The intersection of the tapered fiber 15 is positioned close to the graphene layer 13 formed on the surface of the support 11. Thus, the intersection of the tapered fiber 15 is positioned in the mode field range of the graphene layer 13. Additionally, other regions than the specific region of the tapered fiber 15 may be positioned close to the graphene layer 13. For example, as shown in FIG. 2, the entire ring may be positioned close to the graphene layer 13.

The graphene layer 13 serves as a saturable absorber for oscillation of the passive-mode-locked laser, and functions in satisfying the self-phase-locking condition between the mode traveling in the laser cavity and the mode of the ring resonator made of the tapered fiber 15.

FIG. 4A is a conceptual diagram of destructive interference of modes passing through the laser cavity and the resonator according to an embodiment of the present disclosure, and FIG. 4B is a conceptual diagram of constructive interference of modes passing through the laser cavity and the resonator according to an embodiment of the present disclosure. In FIGS. 4A and 4B, the dotted line indicates the envelope of the pulse.

Referring to FIGS. 4A and 4B, graphene induces self-phase-locking of the surviving modes having random phases. The phase matching condition between modes is an essential condition for forming a pulse laser, and depends on saturable absorption of graphene.

Due to the frequency characteristics, light in the wavelength bands for communication (for example, having the frequency of about 193.1 THz) has multiple oscillations in one pulse, and the phase locking condition for phase matching between modes that form each oscillation should be satisfied.

As shown in FIG. 4A, destructive interference occurs between phase unmatched modes (mode 1 and mode 2 in FIG. 4A), and the intensity reduces. Light of a wavelength corresponding to the resonant period of the ring resonator 10 (i.e., the ring tapered fiber corresponding to the tapered fiber 15 that forms the ring) is removed by absorption in the graphene while traveling in the ring tapered fiber 15 during the repeated circulation in the laser cavity.

In contrast, as shown in FIG. 4B, constructive interference occurs between modes having the matched phases (mode 1 and mode 3 in FIG. 4B), and the intensity increases.

The modes having a gradual increase in intensity due to constructive interference during the repeated circulation in the laser cavity one or more times are not absorbed in the graphene and are allowed to pass through, and eventually form highly repetitive laser pulses. The pulse laser passing through the graphene layer 13 has a GHz scale high repetition rate.

In an embodiment, among the surviving modes by the saturable absorption of the graphene layer in the filtered light traveling in the ring resonator 10 made of the tapered fiber 15, the modes having the matched phases of the interference pattern may be output.

The laser cavity of the passive-mode-locked pulse laser oscillation system 1 is longer than the ring tapered fiber 15. For example, the laser cavity is about a few tens of meters (for example, about 45.4 m) in length. Thus, the pulse repetition rate by the laser cavity is on the MHz level (for example, about 4.5 MHz). In contrast, the ring tapered fiber 15 is about a few to a few tens of millimeter (for example, about 3.1 mm) in length. Thus, the pulse repetition rate of the ring resonator 10 is on the GHz level (for example, 1.36 GHz). Since the length of the ring tapered fiber 15 is short, the pulse traveling in the ring resonator 10 is coupled to the laser cavity again through the coupling region remarkably frequently.

Meanwhile, when simply the ring shaped tapered fiber 15 is connected to the laser cavity, the pulse train of the laser cavity is not synchronized with the pulse train of the ring tapered fiber 15. Instead, modes passing through the laser cavity and the ring resonator 10 in the passive-mode-locked pulse laser oscillation system 1 of FIG. 1 are synchronized by the graphene layer 13 of the tapered fiber 15. The synchronized pulses grouped by area in the light spectrum of FIG. 3 pass through the graphene layer 13 and survive by constructive interference between the passing modes. However, the other modes suffer energy losses, have a gradual reduction in intensity and are absorbed in the graphene during the circulation in the laser cavity and the ring tapered fiber 15 of the passive-mode-locked pulse laser oscillation system 1.

The modes satisfying the above Equation 1 are present in the tapered fiber 15. The phase of mode is locked by the saturable light absorption of graphene, and phase locking temporarily provides constructive interference between modes. The constructive interference results in periodic pulse oscillations in the time domain.

The graphene layer 13 serving as graphene which is the saturable absorber for the mode-locked laser operates as a critical self-phase matching component between the mode of the laser cavity and the mode of the ring tapered fiber 15 to form a pulse laser with a high repetition rate.

In the passive-mode-locked pulse laser oscillation system 1 of FIGS. 1 and 3, the intensity of light filtered by the ring tapered fiber 15 may be represented as the following Equation:

$$E_{pass} = E_{input} e^{i(\pi+\phi)} \frac{a - re^{-i\phi}}{1 - rae^{i\phi}}$$ [Equation 5]

Here, a is the amplitude during a single round-trip in the ring tapered fiber 15, r is the optical coupling coefficient, $\phi$ is a change in phase during a single round-trip and may be represented as $\phi = \beta L$. That is, the phase change depends on the propagation constant or the length L of the ring tapered fiber 15.

The pulse (indicated as a dotted line within the laser cavity in FIG. 3) traveling in the laser cavity keeps circulating in the clockwise direction. Some are coupled into the ring tapered fiber 15 each time they go through the intersection of the ring tapered fiber 15. The pulse (indicated as a dotted line along the ring resonator in FIG. 3) traveling in the ring tapered fiber 15 circulates in the counterclockwise direction. Additionally, the pulse is coupled to the laser cavity again each time the pulse propagates to the laser cavity through the intersection.

Among the surviving modes in the light of wavelengths having high transmission during the repeated circulation in the laser cavity and the ring tapered fiber 15, only phase matched and constructively interfering modes survive and are output through the optical coupler 160.

As a result, when passing through the ring-shaped tapered fiber 15, only modes filtered by the ring tapered fiber 15 survive, not all modes explained by the above Equation 1. As a result, as shown in FIG. 3, light having the spectrum of a wider spacing is output from the entire laser cavity, not a light spectrum of a narrower spacing due to all the surviving modes.

Additionally, the tapered fiber 15 may form the ring resonator such that the extinction ratio of transmission of the traveling light is maximum.

The intensity of light traveling in the ring tapered fiber 15 may be written as the following Equation.

$$\left|\frac{b_1}{a_1}\right|^2 = (l = \gamma_0) \times \left[l - \frac{(l - k_r)^2}{(l + k_r)^2 - 4k_r \sin^2((\beta L'/2) - (\pi/4))}\right]$$ [Equation 6]

Here, a1 and b1 denote the mode amplitudes of incident light and output light, and $\beta$ denotes the propagation constant. L' is $L + L_{overlap}$ where L is the length of the ring, and l is the length of overlap in the ring. Kr denotes the intensity coupling coefficient and is defined as the following Equation:

$$k_r = (1 - \gamma_0) \exp(-2\alpha_0 L)$$ [Equation 7]

Here, $\alpha_0$ is the amplitude attenuation coefficient of the optical fiber, and $\gamma_0$ is the partial coupler intensity loss.

A reduction in transmission as a function of wavelength of light passing through the ring tapered fiber 15 represents a change in phase of light passing through the ring resonator, and depends on $\beta L'$. $\beta L'$ may be written as the following Equation:

$$\beta L' = m 2\pi - (\pi/2), (m \text{ is an integer})$$ [Equation 8]

The intensity of the transmitted light sharply reduces in each condition of m satisfying the integer. Among them, the condition in which a reduction of light is maximum may be referred to as critical coupling.

The tapered fiber 15 may form a ring at an angle between the input terminal and the output terminal such that an extinction ratio of transmission of light passing through the ring resonator is maximum based on the above Equations 3 to 5.

In an embodiment, the tapered fiber 15 may form a shape such that the extinction ratio of transmission is maximum, and then get close to the support 11 and the graphene layer 13. The ring tapered fiber 15 is close to the graphene layer 13, and the graphene layer 13 interacts with light traveling in the ring resonator. The interaction between the ring tapered fiber 15 and the light is conducted via nondestructive physical contact through the evanescent field.

Figure 5A:
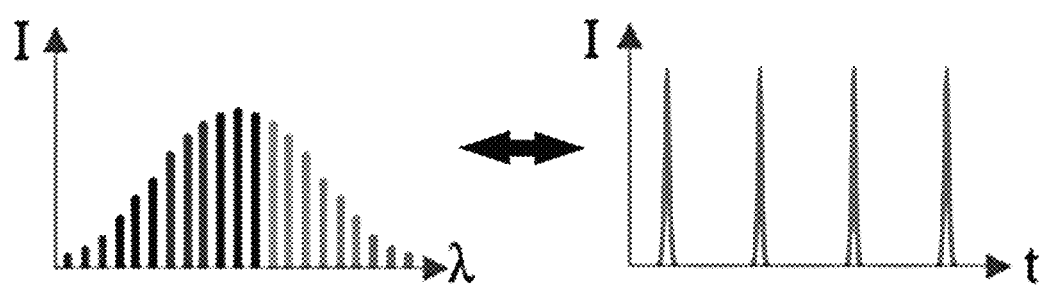
FIG. 5A shows a pulse laser oscillating in a passively mode-locked pulse laser oscillation system having only a laser cavity of FIG. 1.
Figure 5B:
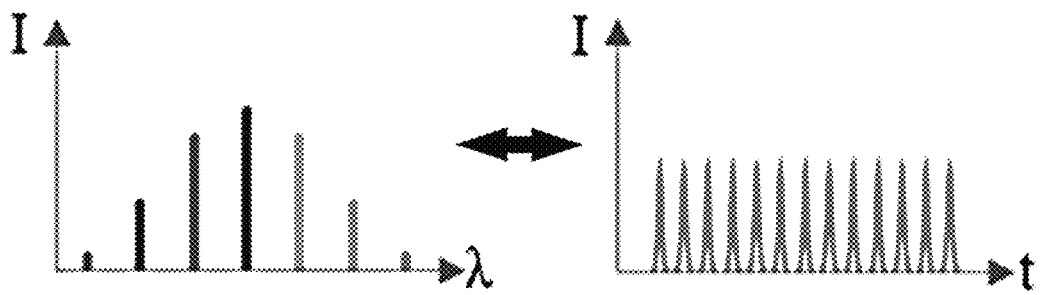
FIG. 5B shows a pulse laser oscillating in a passively mode-locked pulse laser oscillation system with an addition of the resonator of FIG. 2 to a main laser cavity, induced to filter the limited wavelengths from the spectrum.

FIG. 5A shows the pulse laser oscillating in the pulse laser oscillation system having only the passive-mode-locked laser cavity of FIG. 2, and FIG. 5B shows the pulse laser oscillating in the passive-mode-locked pulse laser oscillation system with an addition of the resonator of FIG. 2 to the laser cavity, induced to filter the limited wavelength.

Referring to FIG. 5A, the pulse laser oscillating by the prior passivelymode-locked pulse laser oscillation system using only the laser cavity and the graphene based on the interaction with the graphene layer 13 alone has a narrower line spacing in the optical spectrum. Hence, the prior passively mode-locked pulse laser oscillation system has pulses of a wider spacing in the time domain, resulting in a low repetition rate.

In contrast, referring to FIG. 5B, the pulse laser oscillating by the passive-mode-locked pulse laser oscillation system of FIG. 1 based on the interaction with the graphene layer 13 and the filtering effect of the ring tapered fiber 15 has a spectrum of a wider spacing in the wavelength domain, and accordingly has pulses of a narrower spacing in the time domain, resulting in a repetition rate of very high GHz level.

Additionally, the passive-mode-locked pulse laser oscillation system 1 may control the repetition rate of the laser pulse.

In an embodiment, the passive-mode-locked pulse laser oscillation system 1 may control the repetition rate of the laser pulse by controlling the length of the ring resonator 10.

Figure 6:
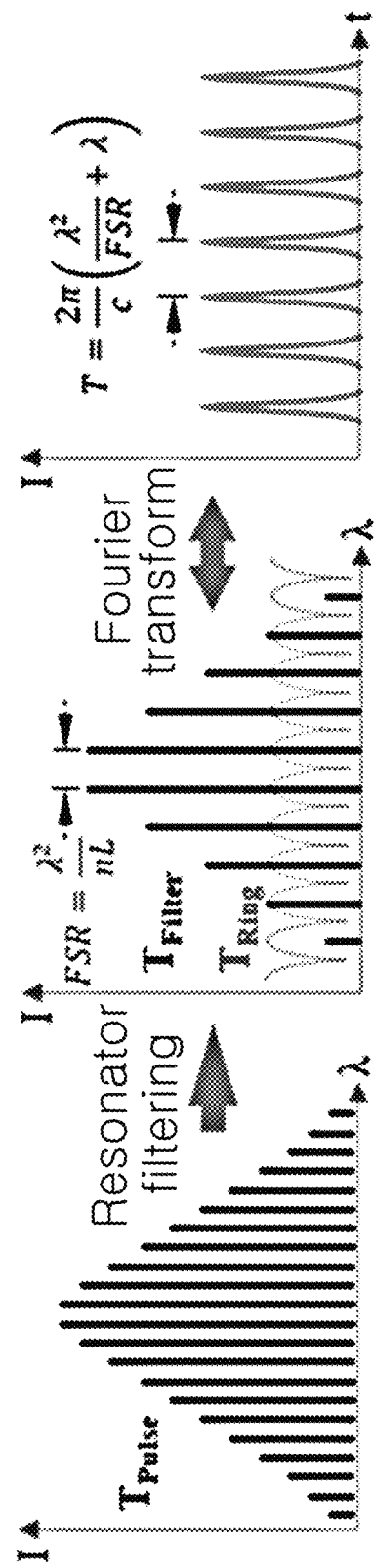
FIG. 6 is a diagram showing a relationship between a wavelength axis and a time axis of pulses formed by only a main laser cavity according to an embodiment of the present disclosure and pulses formed when a resonator is added.

FIG. 6 is a diagram showing a relationship between the wavelength axis and the time axis of the laser pulses according to an embodiment of the present disclosure.

When light of the original pulse spectrum $T_{pulse}$ shown on the left side of FIG. 6 is input to the ring tapered fiber 15, the spectrum $T_{filter}$ filtered by the ring tapered fiber 15 is obtained.

The transmission Tring filtered through the ring tapered fiber 15 may be represented as the following Equation:

$$T_{ring} = \left|\frac{E_2}{E_1}\right|^2 = \frac{\alpha^2 - 2\kappa\alpha\cos\phi + \kappa^2}{1 - 2\kappa\alpha\cos\phi + \kappa^2\alpha^2} \quad \text{[Equation 9]}$$

Here, $E_1$ denotes incident light of the ring tapered fiber 15, $E_2$ denotes output light of the ring tapered fiber 15, α denotes an amplitude transmission factor, κ denotes an intensity coupling coefficient, and ϕ denotes a round-trip phase shift. The line spacing in the light spectrum of the pulse laser depends on the FSR of the ring resonator 10, and may be represented as the following Equation:

$$\Delta\lambda = \frac{\lambda^2}{NL} \quad \text{[Equation 10]}$$

Here λ is the wavelength of incident light to the ring resonator constructed with the tapered fiber 15, N(=n−λ(dn/dλ)) is the group index, and L is the length of the ring tapered fiber 15.

The spectrum of the pulse laser has a comb shape having low transmission in each resonance frequency of the ring tapered fiber 15 in the sech shaped envelope which is a theoretical solution of the passive-mode-locked laser using graphene which is the saturable absorber.

The wavelength domain and the time domain of light always have a Fourier transformation relationship. The light spectrum of the pulse laser oscillating by the prior passive mode-locking has a shape of solid line $T_{pulse}$ shown in FIG. 6. However, the pulse laser in the passive-mode-locked pulse laser oscillation system 1 including the laser cavity and the ring resonator experiences the filtering effect of the ring resonator 10 shown as dotted line $T_{ring}$ in FIG. 6. Accordingly, the pulse laser is converted into a wavelength comb having a regular spacing in the envelope of the sech function. The spacing between each line in the wavelength comb is determined by the FSR of the ring resonator 10. When the comb function is Fourier transformed, periodic pulse functions are obtained such as shown on the right side of FIG. 6. Each pulse function represents a single pulse, and the spacing T between pulses is inversely proportional to the FSR which is the line spacing in the light spectrum. When the FSR reduces, the pulse repetition rate also reduces.

Figure 7A:
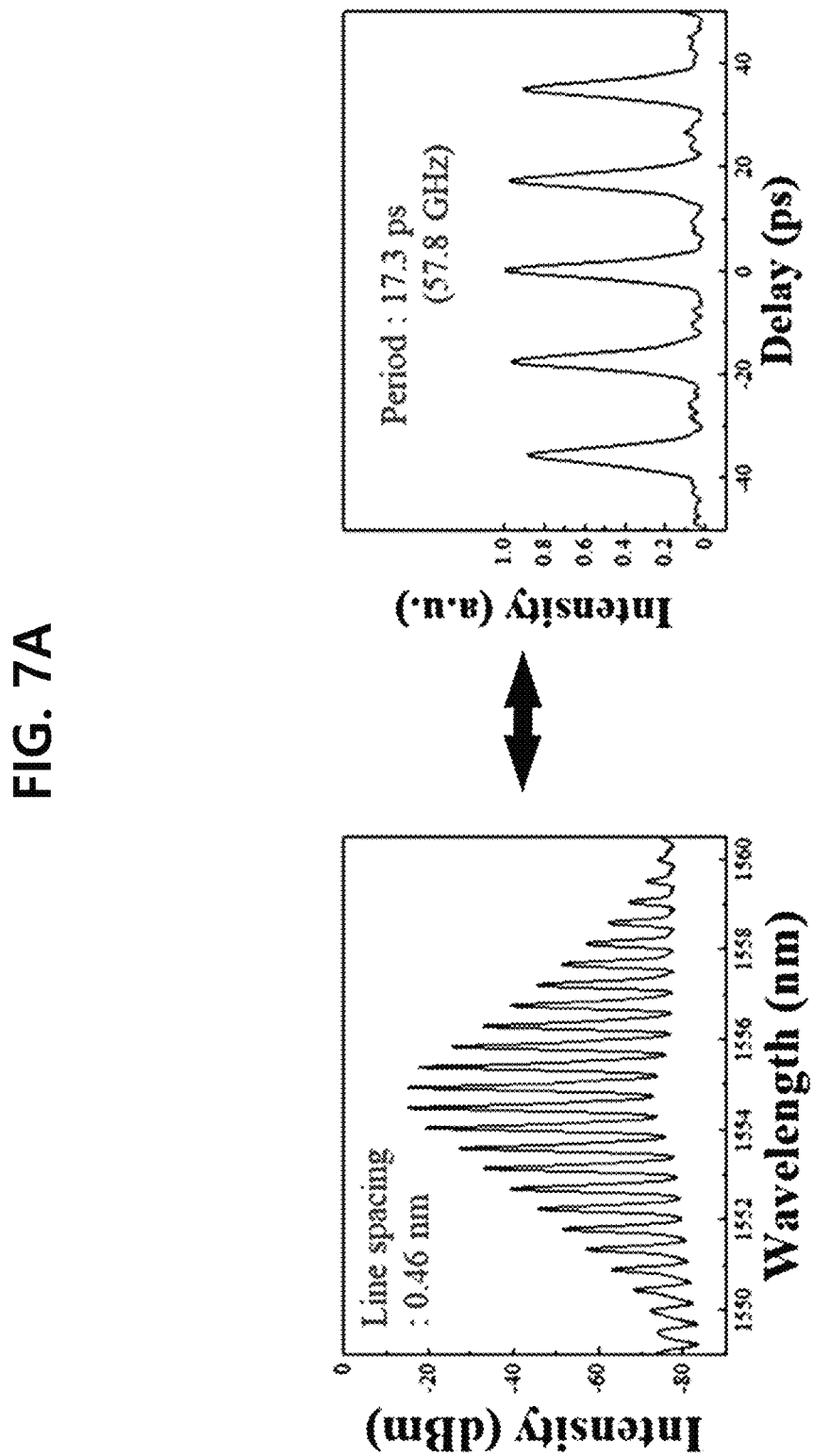
FIGS. 7A and 7B are diagrams showing a pulse laser with controlled repetition rate based on the diameter of a resonator made of a tapered fiber according to an embodiment of the present disclosure.
Figure 7B:
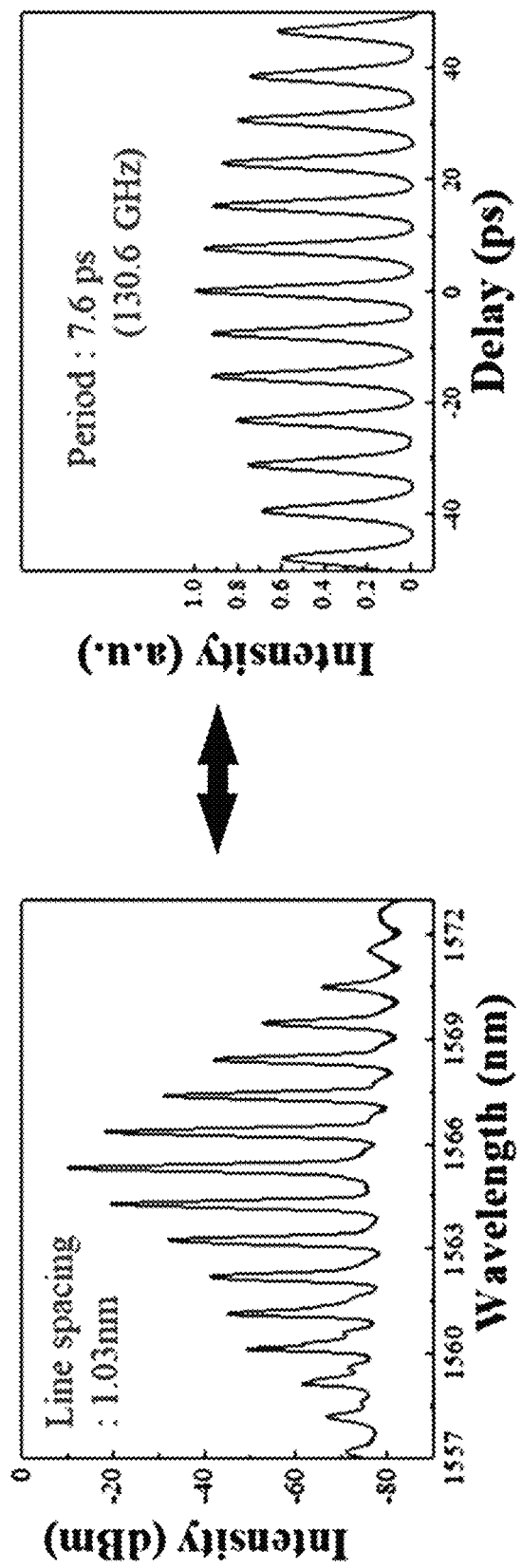

FIGS. 7A and 7B are diagrams showing the pulse laser with controlled repetition rate based on the diameter of the ring resonator of the tapered fiber according to an embodiment of the present disclosure.

FIG. 7A is a graph of the pulse laser obtained using the copper wire 11 having the diameter of 1 mm. The FSR of the ring tapered fiber 15 having the diameter of 1 mm is about 0.5 nm, and the repetition rate of pulses filtered by the ring tapered fiber 15 is approximately 60 GHz.

In contrast, when the diameter of the ring reduces to 0.5 mm, the FSR increases (about 1 nm), and eventually, the repetition rate of the pulse laser increases to a few hundreds of GHz (about 130.6 GHz) as shown in FIG. 7B.

As a result, since the frequency and time components of light have a Fourier transformation relationship, a change in pulse spectrum brings a change in time component such as the pulse width or duration together. The pulse repetition rate may be controlled by changing the length L of the ring of the ring resonator 10. Thus, the repetition rate of the pulse laser of the ring tapered fiber 15 may be increased up to a few tens to a few hundreds of GHz by controlling the length L of the ring tapered fiber 15.

Additionally, the ring resonator 10 may control the pulse repetition rate based on the photo-thermal effect of the graphene layer 13. When the graphene layer 13 absorbs light, heat is generated. This phenomenon is called the photo-thermal effect.

An additional pump light may be input to the ring resonator 10 through the light source 210 in the opposite direction to the direction of the laser traveling in the laser cavity. Then, the graphene layer 13 in contact with the tapered fiber 15 may absorb the light in the wavelength bands for communication, and the temperature may increase above about 100° C. The generated heat expands the size of the support 11 (for example, copper), causing a change in diameter of the ring resonator 10 made of the tapered fiber 15.

Additionally, the heat of the graphene layer 13 expands the tapered fiber that forms the ring resonator in the vertical direction. The thermal expansion of the optical fiber in the vertical direction causes a change in refractive index of the optical fiber.

As a result, the additional heat generation increases the physical distance and the optical distance of light in the same direction, and thus reduces the FSR and lowers the pulse repetition rate.

FIG. 8A is a diagram showing a change in light spectrum of the pulse laser with a change in diameter of the ring resonator according to an embodiment of the present disclosure, and FIG. 8B is a diagram showing a change in spacing of the pulse laser in the time domain with a change in diameter of the ring resonator according to an embodiment of the present disclosure.

Since the FSR of the ring resonator 10 is determined by the diameter, the added light power may control the line spacing of the light spectrum, and eventually may control the period of the pulse laser. As shown in FIGS. 8A and 8B, when the diameter of the ring resonator increases by the expansion of the support 11 due to the photo-thermal effect, the period of the pulse laser increases. As a result, when the diameter increases, the repetition rate of the pulse laser reduces.

Additionally, the ring resonator 10 may include a plurality of tapered fibers 15. As shown in FIG. 2, each tapered fiber 15 has a structure in which it is disposed around the graphene layer 13. For example, some or all of the plurality of tapered fibers 15 may have a ring shape.

In some embodiments, some or all of the plurality of tapered fibers 15 in the ring resonator 10 may be formed with a structure having different internal distances between the tapered fibers 15 disposed around the support 13. When all of the plurality of tapered fibers 15 form a ring structure, the diameters of some or all of the plurality of tapered fibers 15 may be different.

Additionally, the support 11 may be formed with different diameters at a region and another region. For example, the support 11 may be configured to have its diameter corresponding to the diameter of each of the plurality of ring resonators having different diameters like a conical shape. Thus, expansion to enable a multichannel task is possible.

In the case of the plurality of rings, multiple channels may be simultaneously used by simultaneously connecting to the main laser cavity through a splitter, or a single channel may be used by optionally connecting to the laser cavity as necessary by an optical switch.

Experimental Example

The laser oscillation system 1 including the ring structure having the intersection, combined with the laser cavity for laser oscillation by periodically filtering only a specific wavelength in the resonator 10; and the graphene 13 for mode-locking of modes traveling through the laser cavity and the resonator 10, may have an increase in repetition rate of output pulses by a combination of the laser cavity, the ring structure having the intersection in the resonator 10 and the graphene 13, and eventually, output an ultrashort pulse laser. This effect is clearly supported through experimentation.

In the experimental example, the tapered fiber 15 obtained through the following fabrication process is used to form the ring resonator 10.

The single mode optical fiber is fixed over two moving stages capable of controlling the location of the optical fiber for parallel arrangement. Each moving stage may be connected to an individual actuator, and the operation of the actuator may be controlled by a customized program accurately and automatically. The actuator tapers the single mode optical fiber by pulling two fixed points of the single mode optical fiber in the opposite directions while heating the center of the fixed fiber. The diameter of the tapered fiber 15 is reduced to 10 μm to 700 nm with the insertion loss of about 1 dB by controlling the heating spark and the motion of the actuator.

The graphene layer 13 is synthesized on the surface of the copper wire 11. The copper wire 11 is pre-washed by immersing in nitric acid (5 wt %) for 5 min, and then washed in each of a distilled water bath, an acetone bath and/or an isopropyl alcohol bath. The washed copper wire 11 is thermally annealed at a hydrogen gas flow of 850 sccm in a CVD furnace at 400° C. for 20 min. The graphene layer 13 is synthesized at a methane gas flow of 50 sccm at 1025° C. for 15 min. The CVD furnace is opened for fast cooling immediately after synthesis.

Figure 9:
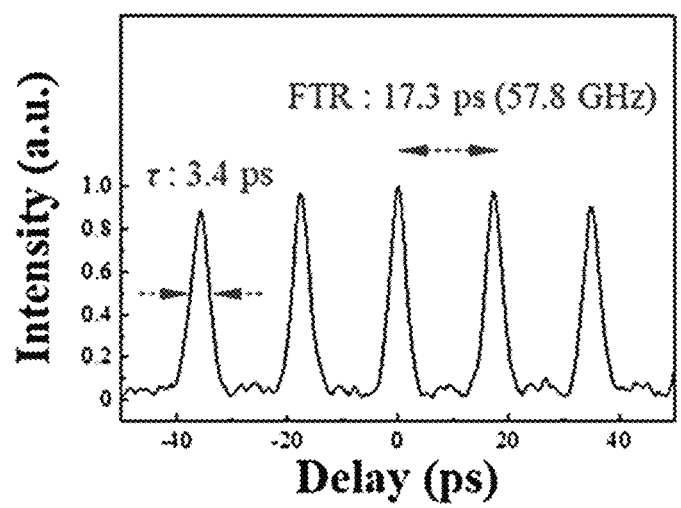
FIG. 9 is a diagram showing the characteristics of a pulse laser produced by a resonator additionally inserted into a laser cavity and graphene which interacts with the resonator according to an experimental example of the present disclosure.

The tapered fiber 15 forms a ring around the copper wire 11 coated with the graphene layer 13. The tapered fiber 15 is fixed at a separate location to prevent damage, and supported in contact with the copper wire 11. Light passing through the ring resonator 10 is observed using a light spectrum analyzer. FIG. 9 is a diagram showing the characteristics of the pulse laser produced by the laser ring resonator and the ring resonator in contact with graphene according to an experimental example of the present disclosure.

As shown in FIG. 9, the passive-mode-locked pulse laser oscillation system 1 may oscillate a pulse laser of a few tens of GHz, for example, about 57 GHz.

Figure 10:
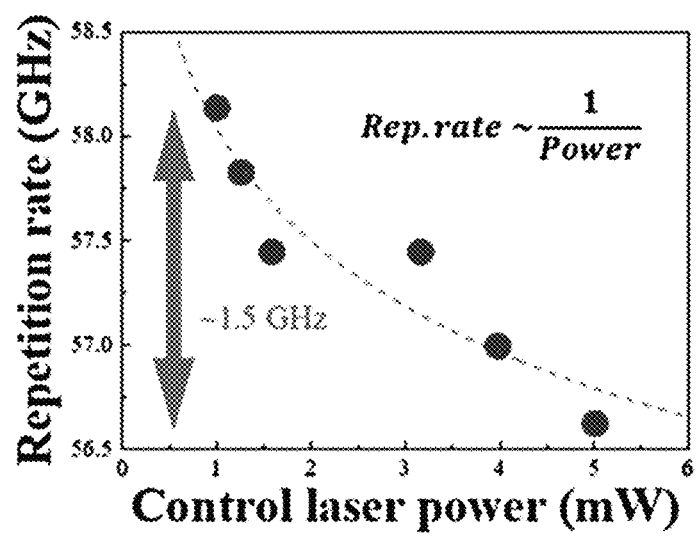
FIG. 10 is a diagram showing a result of controlling a repetition rate of a pulse laser by thermal expansion according to an experimental example of the present disclosure.

FIG. 10 is a diagram showing the result of controlling the repetition rate of the pulse laser by thermal expansion according to an experimental example of the present disclosure.

Referring to FIG. 10, the thermal expansion coefficient of copper is about $1.75 \times 10^{-5}$ °$C.^{-1}$. When the power of light traveling in the ring rises from 1 mW to 5 mW, the repetition rate reduces to 1.5 GHz due to a change in diameter of the ring caused by the thermal expansion. That is, the repetition rate may be dramatically controlled from a few tens of GHz to a few GHz.

While the present disclosure has been hereinabove described with reference to the embodiments shown in the drawings, this is provided for illustration purposes only and it will be appreciated by those skilled in the art that various modifications and variations may be made thereto. However, it should be noted that such modifications fall in the technical protection scope of the present disclosure. Therefore, the true technical protection scope of the present disclosure should be defined by the technical spirit of the appended claims.

DETAILED DESCRIPTION OF MAIN ELEMENTS

10: Resonator
11: Support
13: Graphene layer
15: Tapered fiber
110, 210: Light source
120: WDM
130: Amplifier
140: Polarization controller
150: Optical isolator
160: Optical coupler
170: Single mode optical fiber

The invention claimed is:

1. A resonator for a laser oscillation system including a laser cavity for laser oscillation, the resonator comprising: a saturable absorption layer formed on a support and a tapered fiber disposed around at least part of the support to be adjacent to the saturable absorption layer, wherein the tapered fiber is formed so that directions of an optical path of a part extending from one end of the tapered fiber and another optical path of another part extending from the other end are different from each other, wherein the support is made of a material which changes in size by reaction with heat, the saturable absorption layer generates heat when absorbing light, and a repetition rate of the output light from the tapered fiber is adjusted by the heat induced size change of the support.

2. The resonator according to claim 1, wherein the resonator generates an interference pattern in which constructive interference or destructive interference repeats according to a wavelength of the light traveling along the same path.

3. The resonator according to claim 1, wherein the saturable absorption layer is formed on at least part of a surface of a cross section of the support, and
    at least part of the tapered fiber comes into contact with the saturable absorption layer.

4. The resonator according to claim 1, wherein the light traveling in the tapered fiber interacts with the saturable absorption layer, and
    some modes that have phases being matched in the light traveling in the tapered fiber constructively interfere to output a higher intensity of light, and other modes that have phases being unmatched in the light traveling in the tapered fiber destructively interfere to output a lower intensity of light.

5. The resonator according to claim 4, wherein the tapered fiber forms a shape of ring, and
    the ring of the tapered fiber filters a spectrum of the traveling light at a periodic spectral spacing.

6. The resonator according to claim 4, wherein a resonance wavelength of the interference pattern by the light traveling in the ring is represented as the following Equation:

$$\lambda_{res} = nL/m \quad \text{[Equation]}$$

where L is a length of the ring, n is a refractive index of the ring, m is an integer of 1 or greater, and destructive interference periodically occurs in proportion to a value of m, and
    wherein the modes having the phases being matched each other are filtered to output from surviving modes by saturable absorption of the saturable absorption layer within the light traveling in the tapered fiber.

7. The resonator according to claim 6, wherein when the filtered light is re-input through an input terminal of the ring, the intensity of the modes having the matched phases increases, and the intensity of the modes having the unmatched phases reduces.

8. The resonator according to claim 7, wherein the saturable absorption layer absorbs a mode having a predetermined intensity or less.

9. The resonator according to claim 4, wherein the ring is formed such that an extinction ratio of transmission of the light traveling in the ring is maximum.

10. The resonator according to claim 1, wherein a repetition rate of the pulses through the tapered fiber is adjustable based on a diameter of the ring formed by the tapered fiber disposed around the support.

11. The resonator according to claim 1, wherein the support is made of a material that show catalytic activity for the catalytic layer synthesis.

12. The resonator according to claim 1, wherein the repetition rate of the output light reduces when the diameter of the support is increased by thermal expansion.

13. A pulse laser oscillation system, comprising:
    the resonator according to claim 1;
    a first light source which supplies light to an input terminal of the tapered fiber;
    a Wavelength Division Multiplexer (WDM) which performs wavelength division multiplexing of the light of the first light source;
    an amplifier which amplifies an input light;
    a polarization controller which controls a state of polarization of the light;
    an optical isolator which allows unidirectional propagation of the light; and
    an optical fiber which forms a laser cavity.

14. The pulse laser oscillation system according to claim 13, further comprising:
    a second light source which supplies a pump light through an output terminal of the tapered fiber.

15. A resonator for a laser oscillation system including a laser cavity for laser oscillation, the resonator comprising: a saturable absorption layer formed on a support; and a plurality of tapered fibers disposed around at least part of the support to be adjacent to the saturable absorption layer, wherein the tapered fiber is formed so that directions of an optical path of a part extending from one end of the tapered fiber and another optical path of another part extending from the other end are different from each other, wherein at least some of the plurality of tapered fibers have different diameters.

16. A resonator for a laser oscillation system including a laser cavity for laser oscillation, the resonator comprising: a saturable absorption layer formed on a support; and a tapered fiber disposed around at least part of the support to be adjacent to the saturable absorption layer, wherein the tapered fiber is formed so that directions of an optical path of a part extending from one end of the tapered fiber and another optical path of another part extending from the other end are different from each other, wherein the support is formed with different diameters at a region and another region.

* * * * *